(12) United States Patent
Liang et al.

(10) Patent No.: US 9,109,978 B2
(45) Date of Patent: Aug. 18, 2015

(54) LIGHT COVER OR HOOD FOR LIVE OPTICAL FIBER IDENTIFIER TOOL

(71) Applicant: OFS Fitel, LLC, Norcross, GA (US)

(72) Inventors: Yue Liang, Peachtree, GA (US); Denis E. Burek, Cumming, GA (US)

(73) Assignee: OFS FITEL, LLC, Norcross, GA (US)

( * ) Notice: Subject to any disclaimer, the term of this patent is extended or adjusted under 35 U.S.C. 154(b) by 190 days.

(21) Appl. No.: 13/861,588

(22) Filed: Apr. 12, 2013

(65) Prior Publication Data

US 2014/0307250 A1    Oct. 16, 2014

(51) Int. Cl.
*G01B 21/00* (2006.01)
*G01M 11/00* (2006.01)
*G01M 11/08* (2006.01)

(52) U.S. Cl.
CPC ............ *G01M 11/35* (2013.01); *G01M 11/088* (2013.01)

(58) Field of Classification Search
CPC .......... G01M 11/3145; G01M 11/335; G01M 11/33; G01M 11/3109; G01M 11/338
USPC ....................................................... 356/73.1
See application file for complete search history.

(56) References Cited

U.S. PATENT DOCUMENTS

| 5,138,690 A | 8/1992 | Cox |
| 5,519,795 A * | 5/1996 | Bender et al. ................. 385/13 |
| 5,708,499 A | 1/1998 | Baden et al. |
| 5,742,715 A * | 4/1998 | Boehlke et al. ................. 385/32 |
| 2002/0007111 A1 * | 1/2002 | Deckert et al. ................ 600/177 |
| 2008/0192241 A1 | 8/2008 | He |

OTHER PUBLICATIONS

Furakawa Electric Co., Ltd., Optical Fiber Identifier ID-H/R Instruction Manual (Aug. 2008).
OFS, Fitel Fusion Splicers, Specifications for ID-H/R Fiber Identifier (2008).
Fujikura Ltd., Specifications for FID-25R & 26R Optical Fiber Identifiers (undated).
JDSU, Specifications for FI-60 Live Fiber Identifier (Mar. 2011).
EXFO, Specifications for LFD-300B/TG-300B FiberFinder (2011).

* cited by examiner

*Primary Examiner* — Tarifur Chowdhury
*Assistant Examiner* — Md Rahman
(74) *Attorney, Agent, or Firm* — Law Office of Leo Zucker

(57) ABSTRACT

A light hood for a fiber identifier tool that includes a head portion having interior photo detectors, a slot for receiving an optical fiber to be tested, and a clamp mechanism for urging the fiber to bend in the vicinity of the photo detectors when the mechanism is operated. The hood has a generally T-shaped body that defines a lower hood portion arranged to engage the clamp mechanism and operate the mechanism when the lower hood portion is pulled downward by a user. An upper hood portion of the body is configured so that when the lower hood portion is engaged with the clamp mechanism and pulled downward, the upper hood portion descends to cover the head portion of the tool including the slot. Outside light is then blocked from entering the slot and reaching the photo detectors whenever a fiber is tested by the tool, thus preventing false indications.

9 Claims, 4 Drawing Sheets

LIGHT COVER OR HOOD FOR LIVE OPTICAL FIBER IDENTIFIER TOOL

BACKGROUND OF THE INVENTION

1. Field of the Invention

The present invention relates to fiber optical apparatus, and particularly to tools that indicate the direction of a light signal in an optical fiber.

2. Discussion of the Known Art

So-called live optical fiber identifier tools are generally known. See, e.g., U.S. Pat. No. 5,708,499 (Jan. 13, 1998), and U.S. Pat. No. 5,138,690 (Aug. 11, 1992); and U.S. Pat. Appl'n Pub. No. 2008/0192241 (Aug. 14, 2008), all of which are incorporated by reference. FIGS. 1 and 2 of the present application are side and front views of an optical fiber identifier tool 1 currently available from OFS Fitel, LLC, Norcross, Ga. 30071 USA, as model No. ID-H/R.

The tool 1 detects and indicates the direction a light signal is traveling in an optical fiber, whether the fiber is contained in a cable or is one among a number of ribboned fibers, without having to disconnect the fiber or otherwise disrupt signal traffic in an associated network. A length of the fiber is aligned in a slot or groove 2 formed in a head portion 3 of the tool 1. A trigger 4 on the tool 1 is fastened by a screw to an internal clamp mechanism, and the mechanism causes the fiber to bend a certain amount inside the head portion 3 when the trigger 4 is pulled downward along the side of the tool body. As is generally known, a small fraction of a light signal traveling in the fiber will leak out from the region of the fiber bend. The tool 1 also has a control panel 5 including a power on/off switch 6, live signal direction indicator lamps 7, and a tool status and measurement data display screen 8.

Two photo detectors are mounted at determined positions inside the head portion 3 of the tool 1. The photo detectors are disposed so that depending on the direction the light signal is traveling in the fiber, a greater amount of the light that leaks from the fiber bend is incident on one of the detectors than on the other detector. Live fiber identifier tools are generally quite effective and often used in fiber optic data centers, FTTx, and related applications.

It is not uncommon for a live fiber identifier tool to produce false indications when used in direct sunlight and even in shaded areas outdoors, however. Even when no signal is present in a fiber under test, ambient light can leak inside the head portion of the tool near the photo detectors and cause either one or both of the detectors to respond, thus making the tool falsely indicate that signal traffic is present. To help avoid this problem, a rubber light shield is available from Fujikura Ltd, Japan, as an accessory (No. LSR-02) for the company's model FID-25R/26R optical fiber identifiers.

The known light shield is made to be placed by hand over the head portion of the tool when testing a fiber. Once placed over the tool, the operator must use one hand to keep the shield in place and, at the same time, use the other hand to operate the tool to take a measurement. Therefore, by the time the measurement is taken, the shield is likely to have shifted from a most effective position so as to allow enough ambient light to enter the tool to cause a malfunction. Accordingly, there remains a need for a light cover or hood for a fiber identifier tool that is convenient to use, and which will operate reliably to block outside light under all conditions.

SUMMARY OF THE INVENTION

According to the invention, a light cover or hood is provided for a fiber identifier tool of the kind that includes a head portion having interior photo detectors, a slot for receiving an optical fiber to be tested, and a clamp mechanism for urging the fiber to bend in the vicinity of the photo detectors when the mechanism is operated. The hood includes a generally T-shaped body that defines a lower hood portion arranged to engage the clamp mechanism, and to operate the mechanism when the lower hood portion is pulled downward by a user.

The hood body also defines an upper hood portion configured so that when the lower hood portion is engaged with the clamp mechanism and is pulled by the user to operate the mechanism, the upper hood portion of the body descends to cover the head portion of the tool including the slot. Outside light is blocked by the upper hood portion from entering the slot and reaching the photo detectors at the time a fiber measurement is made, thus avoiding false indications by the tool.

For a better understanding of the invention, reference is made to the following description taken in conjunction with the accompanying drawing and the appended claims.

DETAILED DESCRIPTION OF THE INVENTION

Figure 1:
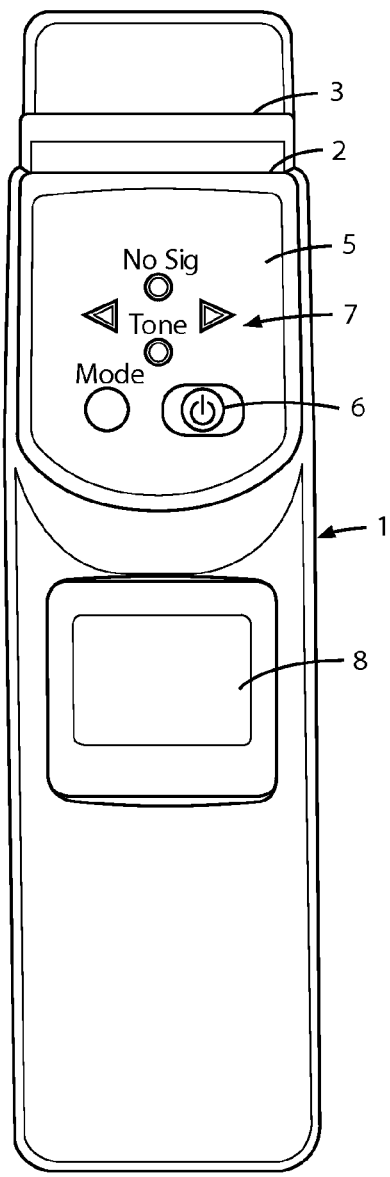
FIG. 1 is a front view in elevation of an optical fiber identifier tool that is currently available.
Figure 2:
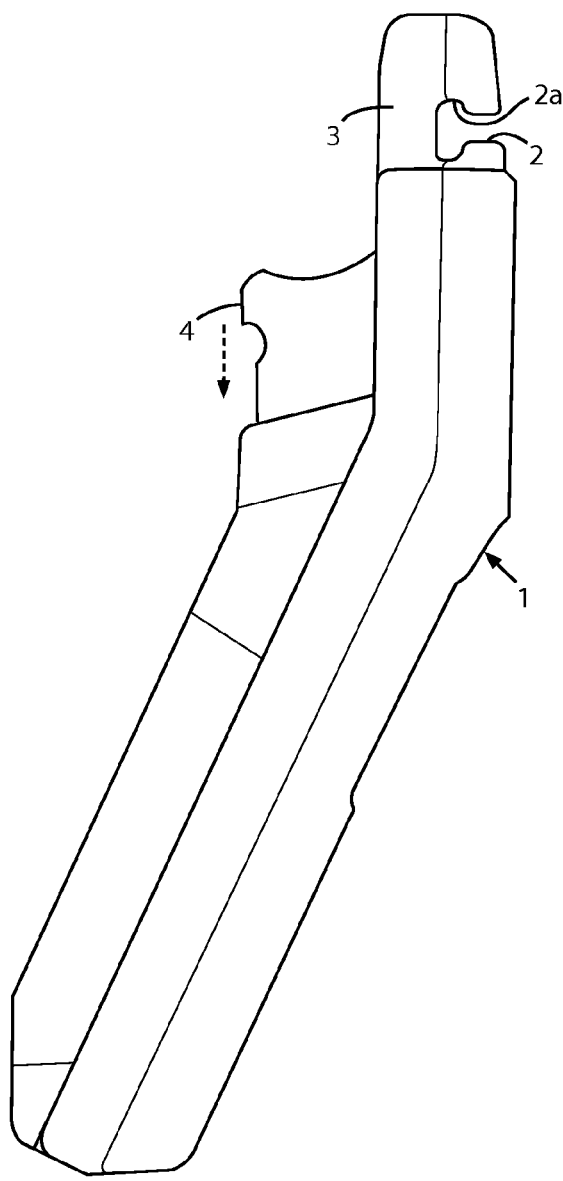
FIG. 2 is a side view in elevation of the fiber identifier tool in FIG. 1.
Figure 3:
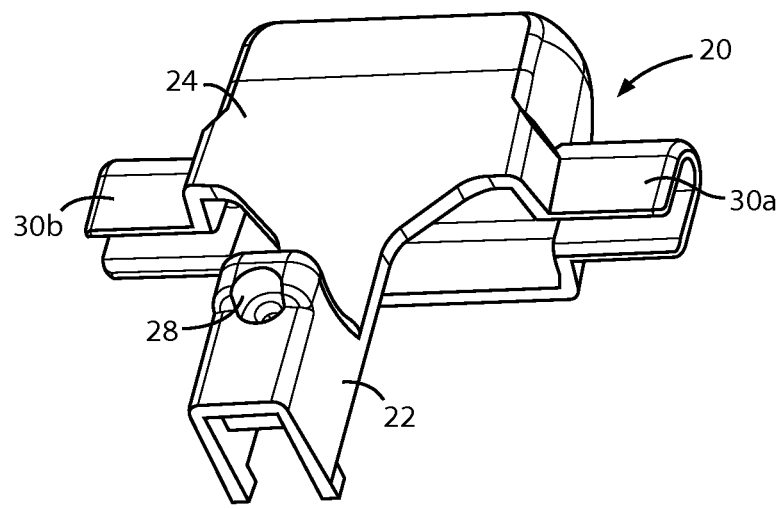
FIG. 3 is a perspective view of a light cover or hood for a live optical fiber identifier tool according to the invention, as seen from the rear of the hood.
Figure 4:
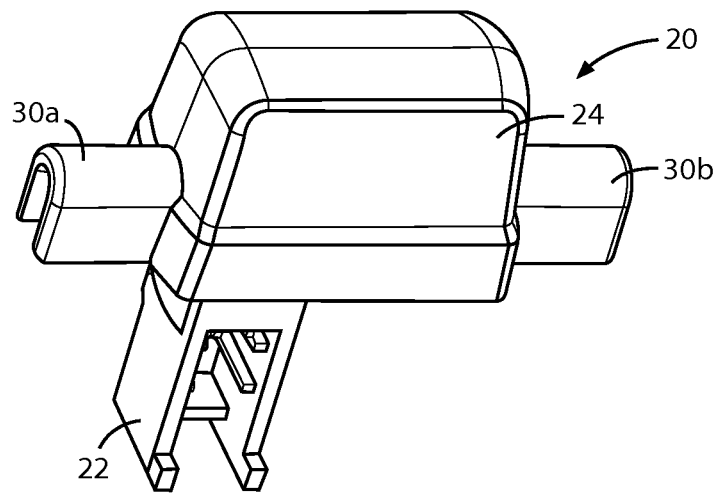
FIG. 4 is a perspective view of the inventive hood in FIG. 3 as seen from the front of the hood.

FIGS. 3 and 4 are perspective views of a light cover or hood 20 for a live optical fiber identifier tool, according to the invention. While the hood 20 is described below with respect to the tool 1 in FIGS. 1 and 2, it will be understood that the hood can be readily adapted for use with other makes and models of fiber identifier tools without impairing the operation of the hood or the tool.

FIG. 3 is a view of the hood 20 from a rear side of the hood, and FIG. 4 is a view of the hood from a front side. The hood 20 may be molded as a unit of a suitable plastics material such as, e.g., Acrylonitrile Butadiene Styrene (ABS). The hood 20 is blackened or sufficiently opaque throughout so that when the hood is affixed to the tool 1 as explained below in connection with FIGS. 5 to 7, and then lowered to shield the fiber receiving slot 2 in the head portion 3 of the tool, outside light is blocked from entering the front of the slot 2 and reaching the interior photo detectors causing the tool to malfunction.

Figure 5:
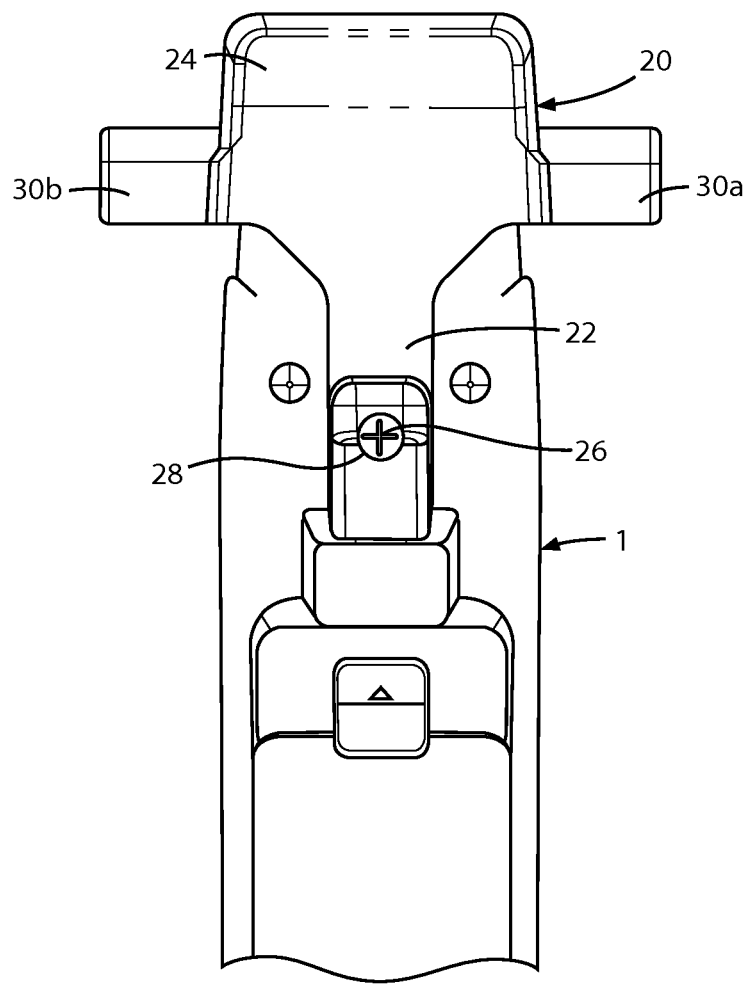
FIG. 5 is a rear view in elevation of an optical fiber identifier tool on which the hood of FIGS. 3 and 4 is fastened according to the invention.

As shown in FIGS. 3 to 7, the hood 20 has a generally T-shaped body that defines a lower hood portion 22 and an upper hood portion 24. In the illustrated embodiment, the lower hood portion 22 is constructed and dimensioned to replace the trigger 4 that is supplied on the existing tool 1 in FIG. 2. That is, the supplied trigger 4 is first disengaged from the clamp mechanism in the tool by removing a screw or other fastener that joins the trigger 4 to the mechanism. The lower hood portion 22 is then joined to the tool clamp mechanism by inserting the removed screw 26 or other fastener through an opening 28 in the lower hood portion 22, and tightening the screw 26 as illustrated in FIGS. 3 and 5. Now, a user can operate the clamping mechanism in the tool 1 by pulling down on the lower hood portion 22 in the same way as when using the trigger 4 supplied on the original tool 1.

Figure 6:
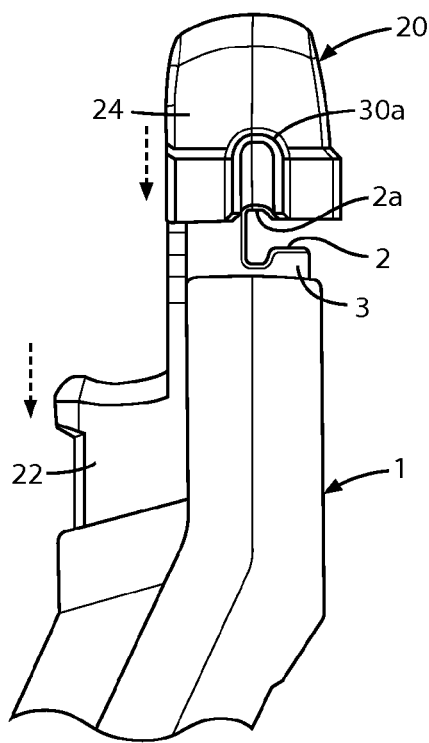
FIG. 6 is a side view in elevation of an optical fiber identifier tool on which the hood of FIGS. 3 and 4 is fastened according to the invention.
Figure 7:
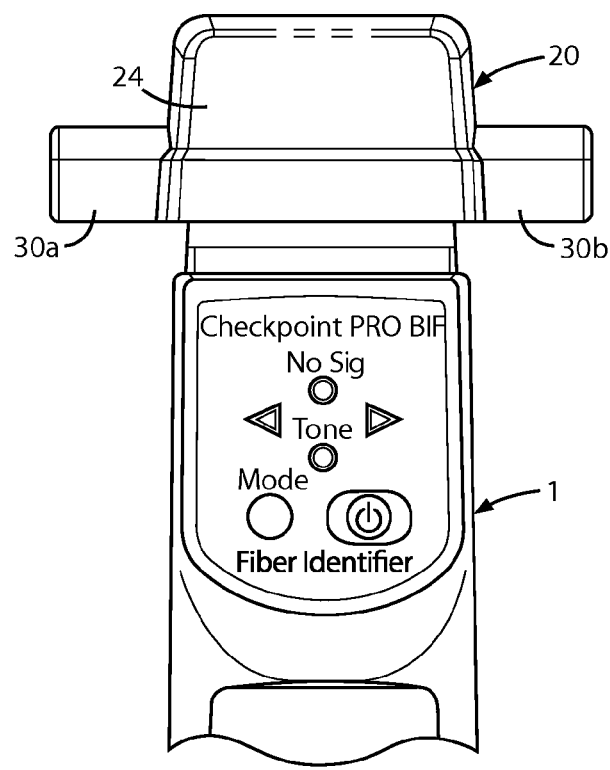
FIG. 7 is a front view in elevation of the optical fiber identifier tool shown in FIG. 6 according to the invention.

The upper hood portion 24 is configured so that when the lower hood portion 22 is engaged with the tool clamp mechanism as in FIGS. 5 and 6, and the user pulls the lower hood portion 22 down to operate the clamp mechanism, the upper hood portion 24 descends simultaneously over the tool head portion 3 and covers the front opening of the slot 2 in which the fiber is received. Outside light is blocked from entering the slot 2 and reaching the photo detectors at the same time a fiber received in the slot is tested by the tool 1, thus averting the possibility of a false measurement. Since the upper hood portion 24 and the lower hood portion 22 are defined by the common hood body, the upper hood portion 24 will descend to shield the slot 2 from outside light in a consistent and reliable manner each time the user pulls the lower hood portion 22 down to initiate a fiber test. That is, unlike the case with the known light shields, the user need not be concerned with the disposition or location of the hood 20 on the tool 1 whenever testing optical cables or fibers.

In order for the hood 20 to be most effective in preventing outside light from entering the slot 2 and reaching the internal photo detectors, the inside surface of the upper hood portion 24 should conform as much as possible in shape to the outside surface of the tool head portion 3. Also, a pair of elongated guideways 30a, 30b are formed to extend from both side ends of the upper hood portion 24. The guideways 30a, 30b have an inverted U cross section, and are located so as to align with end openings 2a of the slot 2 when the hood 20 is lowered to shield the slot. See FIG. 6.

When lowered together with the hood 20, the guideways 30a, 30b cover portions of the fiber over a certain distance from both end openings 2a of the slot 2, and help block any outside light from entering the tool head portion 3 through the end openings 2a of the slot 2 when the hood 20 is fully lowered and while the fiber is being tested. A flexible light absorbing or sealing material such as, for example, a dense foam may also be adhered to the inside surfaces of the upper hood portion 24 and the guideways 30a, 30b, as a further measure to block light from entering the head portion 3 through the slot 2 and causing the tool 1 to malfunction.

Because live optical fiber identifier tools are popular and their use for trouble shooting at network data centers and in FTTx applications is increasing, it is contemplated that the use of the inventive hood 20 as an accessory for such existing tools, or as an original part supplied on or with new fiber identifier tools, will greatly enhance the reliability and performance of the tools under many operating conditions.

While the foregoing represents a preferred embodiment of the invention, it will be understood by persons skilled in the art that various changes, modifications, and additions can be made without departing from the spirit and scope of the present invention, and that the invention includes all such changes, modifications, and additions that are within the scope of the following claims.

We claim:

1. A light cover or hood for placing about a fiber identifier tool, the light cover or hood comprising:
   a lower hood portion and an upper hood portion;
   the upper hood portion is formed to descend and to cover a head portion of a fiber identifier tool including a groove or slot in the head portion after a fiber or cable is received in the groove or slot to perform a measurement;
   a trigger member formed on part of the lower hood portion to engage a clamp mechanism inside the tool for urging an optical fiber or cable received in the groove or slot in the head portion of the tool to bend in the vicinity of photo detectors inside the tool while performing a measurement, and to operate the clamp mechanism when a user pulls the trigger member on the lower hood portion downward relative to the tool;
   the upper hood portion is arranged so that when the user pulls the trigger member on the lower hood portion to operate the clamp mechanism, the upper hood portion descends to cover the head portion of the tool including the fiber or cable received in the groove or slot in the head portion, so that outside light is blocked from entering the groove or slot including the fiber or cable received in the groove or slot;
   the upper hood portion has a pair of guideways extending from opposite side ends of the upper hood portion, so that the guideways align with end openings of the groove or slot in the head portion of the tool when the upper hood portion descends to cover the head portion of the tool; and
   wherein the guideways are arranged to cover a cable or fiber received in the groove or slot over a certain distance from the upper hood portion, to block outside light from entering the head portion of the tool through the end openings of the groove or slot in which the fiber or cable is received.

2. A light cover or hood according to claim 1, wherein the trigger member formed on part of the lower hood portion is dimensioned to replace a like trigger member initially provided on the fiber identifier tool.

3. A light cover or hood according to claim 2, wherein the trigger member formed on part of the lower hood portion has an opening for insertion of a fastener to engage the clamp mechanism inside the tool housing.

4. A light cover or hood according to claim 1, including a light absorbing or sealing material adhered to inside surfaces of at least one of the upper hood portion and the guideways formed on the upper hood portion, for blocking light from entering the head portion of the tool housing through the groove or slot.

5. A light cover or hood according to claim 4, wherein the light absorbing or sealing material comprises a dense foam.

6. A method of blocking outside light from entering a head portion of a fiber identifier tool and reaching photo detectors inside the tool to cause a false measurement, after a fiber or cable received in a groove or slot in the head portion of the tool is urged by a clamp mechanism in the tool to bend in the vicinity of the photo detectors while performing the measurement, the method comprising:
   placing a light cover or hood about the fiber identifier tool, including
   forming an upper hood portion to descend and to cover the head portion of the tool including the groove or slot after a fiber or cable is received in the grove or slot to perform a measurement;
   forming a trigger member on part of a lower hood portion of the light cover or hood;
   arranging the trigger member on the lower hood portion to engage the clamp mechanism in the tool and to operate the clamp mechanism when a user pulls the trigger member downward relative to the tool, thereby causing the upper hood portion to descend to cover the head portion of the tool including the fiber or cable received in the groove or slot and blocking outside light from entering the groove or slot;

extending a pair of guideways from opposite side ends of the upper hood portion to align with end openings of the groove or slot in the head portion of the tool when the upper hood portion descends to cover the head portion of the tool; and forming the guideways to cover a fiber or cable received in the groove or slot over a certain distance from the upper hood portion, to block outside light from entering the head portion of the tool through the end openings of the groove or slot in which the fiber or cable is received.

7. The method of claim 6, including forming the trigger member on the lower hood portion to replace a like trigger member initially provided on the fiber identifier tool.

8. The method of claim 6, including forming an opening in the trigger member on the lower hood portion for inserting a fastener to engage the clamp mechanism in the tool.

9. The method of claim 6, including adhering a sealing material to inside surfaces of at least one of the upper hood portion and the guideways formed on the upper hood portion to block the outside light.

* * * * *